United States Patent
Joo et al.

(10) Patent No.: US 8,563,178 B2
(45) Date of Patent: Oct. 22, 2013

(54) NEGATIVE ELECTRODE FOR LITHIUM SECONDARY BATTERY INCLUDING A MULTILAYER FILM ON A TIN BASED CURRENT COLLECTOR AND MANUFACTURING METHOD THEREOF

(75) Inventors: Kyu-Nam Joo, Suwon-si (KR); Tae-Sik Kim, Suwon-si (KR); Beom-Kwon Kim, Suwon-si (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 460 days.

(21) Appl. No.: 12/923,431

(22) Filed: Sep. 21, 2010

(65) Prior Publication Data
US 2011/0236756 A1    Sep. 29, 2011

(30) Foreign Application Priority Data
Mar. 24, 2010 (KR) .................. 10-2010-0026400

(51) Int. Cl.
H01M 4/66 (2006.01)
H01M 4/42 (2006.01)
H01M 4/40 (2006.01)

(52) U.S. Cl.
USPC ........... 429/245; 429/220; 429/221; 429/223; 429/229

(58) Field of Classification Search
USPC ......... 429/231.95, 219, 220, 129, 218.1, 221, 429/229, 223, 245, 233
See application file for complete search history.

(56) References Cited

U.S. PATENT DOCUMENTS

| 6,265,111 B1 * | 7/2001 | Bito et al. ............... 429/231.95 |
| 2005/0208379 A1 | 9/2005 | Musha et al. |
| 2008/0102359 A1 * | 5/2008 | Kogetsu et al. ............... 429/129 |
| 2009/0008142 A1 * | 1/2009 | Shimizu et al. ............... 174/261 |

FOREIGN PATENT DOCUMENTS

| EP | 1638158 A2 * | 3/2006 |
| JP | 2004-139768 A | 5/2004 |
| JP | 2004-296103 A | 10/2004 |
| JP | 2005-108523 A | 4/2005 |
| JP | 2005-129264 A | 5/2005 |
| JP | 2007-026910 A | 2/2007 |
| JP | 2007-172963 A | 7/2007 |
| JP | 2007-273381 A | 10/2007 |
| JP | 2008-041347 A | 2/2008 |
| JP | 2009-205961 A | 9/2009 |

OTHER PUBLICATIONS

Machine Translation of: JP 2004/139768, Morimoto et al. May 13, 2004.*
Machine Translation of: JP 2007/026910, Miki et al., Feb. 1, 2007.*
"Third-Quarter FY 2009 report for the Batteries for Advanced Transportation (BATT) Program", Berkeley National Laboratory, Aug. 28, 2009, p. 1-13. Retrieved on Feb. 19, 2013 from: http://batt.lbl.gov/battfiles/reports/BATT-Q3-8-28-09.pdf.*

(Continued)

Primary Examiner — Kenneth Douyette
(74) Attorney, Agent, or Firm — Lee & Morse, P.C.

(57) ABSTRACT

A negative electrode for a lithium (Li) secondary battery, a method of forming the same, and a secondary battery, the negative electrode including a tin (Sn) based current collector layer; and a multilayer film on the Sn based current collector, the multilayer film having two or more layers, wherein the multilayer film includes at least one porous layer.

12 Claims, 7 Drawing Sheets

(56) References Cited

OTHER PUBLICATIONS

"High-Capacity, Microporous Cu6Sn5-Sn Anodes for Li-Ion Batteries", Trahey et al., Journal of the Electrochemical Society, 156 (5) A385-A389, Mar. 16, 2009.*

Machine Translation of: JP 2007/172963 A, Sasaki et al., Jul. 5, 2007.*

Tamura, Noriyuki, et al.; Study on Electrochemical Properties of Large Capacity Tin Anode for Lithium Secondary Batteries; Sanyo Technical Review; Jun. 2002: pp. 87-93; vol. 34, No. 1; Japan.

Korean Notice of Allowance in KR 10-2010-0026400, dated Nov. 18, 2011 (Joo, et al.).

* cited by examiner

NEGATIVE ELECTRODE FOR LITHIUM SECONDARY BATTERY INCLUDING A MULTILAYER FILM ON A TIN BASED CURRENT COLLECTOR AND MANUFACTURING METHOD THEREOF

BACKGROUND

1. Field

Embodiments relate to a negative electrode for a lithium (Li) secondary battery and a manufacturing method thereof.

2. Description of the Related Art

Lithium (Li) secondary batteries are a sort of secondary batteries operating according to a principle in which electricity is generated as lithium ions move between a positive electrode and a negative electrode. The Li secondary battery may include a positive electrode, a negative electrode, electrolyte, and a separation film. Positive/negative electrode active materials may have a structure in which Li in an ion state may be capable of being inserted in and separated from an interior of the active material. Charge and discharge may be performed by a reversible reaction.

Li-ion batteries are widely used for mobile information devices such as cellular phones, personal digital assistants (PDAs), and laptops, and recently for automobiles. Li-ion batteries exhibit high energy density, in addition to being compact and light and having high performance. Although the Li-ion battery has been remarkably developed, a new function is desired. In the Li-ion battery, a variety of carbon based materials and a combined oxide of Li and other metal may be widely used for the negative electrode and the positive electrode, respectively. However, the above combination of materials has reached a limit in improving certain battery characteristics, e.g., energy density and/or cycle life span.

SUMMARY

Embodiments are directed to a negative electrode for a lithium (Li) secondary battery and a manufacturing method thereof, which represents advances over the related art.

It is a feature of an embodiment to provide a negative electrode for a lithium (Li) secondary battery which has a superior cycle characteristic.

At least one of the above and other features and advantages may be realized by providing a negative electrode for a lithium (Li) secondary battery, the negative electrode including a tin (Sn) based current collector layer; and a multilayer film on the Sn based current collector, the multilayer film having two or more layers, wherein the multilayer film includes at least one porous layer.

The Sn based current collector layer may include Sn or a combination of Sn and at least one of copper (Cu), nickel (Ni), aluminum (Al), iron (Fe), zinc (Zn), and bismuth (Bi).

The Sn in the Sn based current collector layer may be included in an amount of about 40-90 wt % based on a total weight of the current collector layer.

Each layer of the multilayer film may independently include Sn or a combination of Sn and at least one of copper (Cu), nickel (Ni), aluminum (Al), iron (Fe), zinc (Zn), and bismuth (Bi).

A porous layer and a non-porous layer may be alternately disposed in the multilayer film.

The multilayer film may have a structure of a first porous layer/a first non-porous layer, a first porous layer/a first non-porous layer/a second porous layer/a second non-porous layer, or a first porous layer/a first non-porous layer/a second porous layer/a second non-porous layer/a third porous layer/a third non-porous layer.

The porous layer may have a porosity of about 40-70%.

The porous layer may have a density of about 4 g/cc or less.

The porous layer may have a thickness of about 1-5 μm.

The negative electrode may have a structure of a $Cu_4Sn$ current collector layer/a $Cu_6Sn_5$ first porous layer/a Sn first non-porous layer.

At least one of the above and other features and advantages may also be realized by providing a lithium (Li) secondary battery including the negative electrode for a lithium (Li) secondary battery according to an embodiment.

At least one of the above and other features and advantages may also be realized by providing a method of manufacturing a negative electrode for a lithium (Li) secondary battery, the method including forming a tin (Sn) based current collector layer by plating a plating solution containing Sn on a substrate; forming a porous layer by plating the Sn-containing plating solution on the Sn based current collector; forming a non-porous layer by plating the Sn-containing plating solution on the porous layer; and separating the substrate from the Sn based current collector layer.

The Sn-containing plating solution may include Sn or a combination of Sn and at least one of copper (Cu), nickel (Ni), aluminum (Al), iron (Fe), zinc (Zn), and bismuth (Bi).

The Sn based current collector layer may have a thickness of about 2-30 μm.

The porous layer may have a thickness of about 1-5 μm.

The substrate may be a stainless steel (SUS) substrate or a titanium (Ti) substrate.

Forming the porous layer may be carried out such that a porosity of the porous layer is about 40% to about 70%.

Forming the porous layer by plating the Sn-containing plating solution may include plating at a higher current density than another current density for forming the non-porous layer by plating the Sn-containing plating solution.

At least one of the above and other features and advantages may also be realized by providing a lithium (Li) secondary battery manufactured by the method according to an embodiment.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0026400, filed on Mar. 24, 2010, in the Korean Intellectual Property Office, and entitled: "Negative Electrode for Lithium Secondary Battery and Manufacturing Method Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
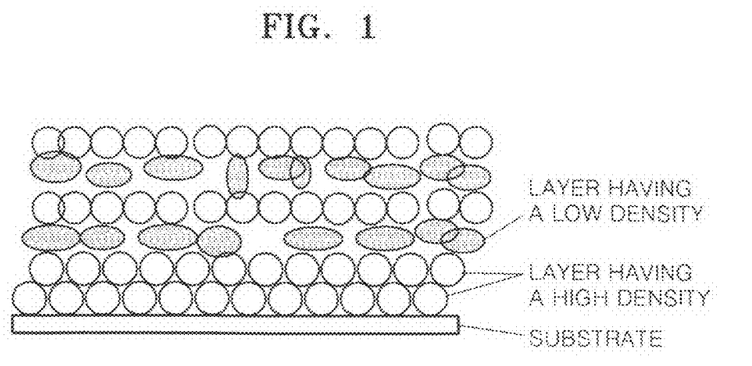
FIG. 1 schematically illustrates a negative electrode for a Li secondary battery including a current collector layer and a quad-layer according to an embodiment.

FIG. 1 schematically illustrates a negative electrode for a Li secondary battery including a current collector layer and a quad-layer according to an embodiment. Referring to FIG. 1, the negative electrode for a Li secondary battery may include a tin (Sn) based current collector layer and a multilayer film formed of two or more layers on the Sn based current collector layer. The multilayer film may include one or more porous layer.

The Sn based current collector may be a current collector layer formed of metal including Sn particles and may include, e.g., Sn or a combination of Sn and at least one of copper (Cu), nickel (Ni), aluminum (Al), iron (Fe), zinc (Zn), and bismuth (Bi). In an implementation, the Sn based current collector layer may be formed by plating a plating solution containing Sn and Cu on a substrate to form a $Cu/Cu_3Sn/Cu_6Sn_5/Sn$ layer.

When the current collector layer includes Sn, energy density thereof may be sufficiently high such that the Sn based current collector may be suitable for the negative electrode of a secondary battery. The Sn in the Sn based current collector layer may be included in an amount of about 40-90 wt %, based on a total weight of the current collector. Maintaining the content of Sn at about 40 wt % or greater may help ensure that sufficient energy density is obtained. Maintaining the content of Sn at about 90 wt % or less may help ensure that a life span characteristic is superior because contraction and expansion is not increased. In an implementation, the Sn may be included in an amount of about 50-70 wt %, based the total weight of the current collector.

The Sn based current collector layer may be a continuously plated film. The plated film may include Sn particles, each Sn particle having a diameter of about 5 μm or less. Maintaining the diameter of a Sn particle at about 5 μm or less may help ensure that contraction and expansion between the particles is small. In an implementation, the diameter of the Sn particle used for the Sn based current collector layer may be about 0.1-3 μm.

The multilayer film formed on the current collector may include two or more layers. At least one of the layers of the multilayer film may be a porous layer. The porous layer may be a layer having a porosity of about 40% or higher. The porosity may be calculated based on a weight measured using a porosity measurement apparatus. In contrast, a non-porous layer may be a layer having a porosity of less than about 40%. The two or more layers of the multilayer film may independently include Sn or a combination of Sn and at least one of, e.g., Cu, Ni, Al, Fe, Zn, and Bi.

A carbon based material has been used as a negative active material for a Li secondary battery. However, since a battery using the carbon based active material has reached a theoretical capacity thereof, further increase of a discharge capacity may be difficult. Alternatively, in addition to the carbon based active material, Sn may be used as the active material, but the embodiments are not limited thereto. For example, a combination of Sn and Cu may be used.

During intercalation/deintercalation Li ions, the Sn based active material may exhibit a very large volume expansion. In particular, the volume expansion of the carbon based material may be only about 1.5 times, whereas the volume expansion of the Sn based material may be about 3.5 times. Due to the volume expansion, during a charge/discharge cycle, the active material may not be fragmentated, or may be detached from the current collector, so that the cycle characteristic may be drastically deteriorated.

When the Sn based material is fragmentated prior to forming layers and the fragmentated Sn based material is mixed with conductive binders and then coated on the current collector, the change in the volume due to the reaction to Li may be reduced and the cycle characteristic may be improved. For example, by fragmentating Sn or a metal alloyed compound thereof, mixing the fragmentated material with conductive binders, and coating the mixture on the current collector, the change in the volume due to the reaction to Li may be reduced; and the cycle characteristic may be improved. However, when Sn or a Sn alloy is used as the active material, a process, e.g., mechanical alloying, gas atomizing, or melt spinning, may be required to form particles, and manufacturing costs may be greatly increased. Also, an intermetallic compound manufactured as above may have a low electric conductivity and a high resistance to insertion or separation of Li so that charge/discharge may be difficult.

An embodiment provides a method of plating with Sn. In particular, a Sn or Sn alloy film may be formed by using a Sn or Sn alloy plating solution on both surfaces of the current collector. When an alloy of Sn and Cu is used, a Sn film may be formed on the current collector and heat treated such that a layered structure in which Cu atoms and Sn atoms are diffused over a Cu—Sn boundary surface may be obtained. Due to diffusion on the Cu—Sn boundary surface, a Cu—Sn alloy having a $Cu/Cu_4Sn/Cu_6Sn_5/Sn$ structure, or a crystal structure close thereto, may be finally formed. The $Cu_6Sn_5$ may be capable of reversibly intercalating/deintercalating Li and may have a small volume change and no catalytic function.

When a plating solution containing Sn and Cu as the negative active material is used, the plating layer may form a $Cu/Cu_4Sn/Cu_6Sn_5/Sn$ layer and $Cu_6Sn_5$ may be formed as a whole.

As described above, when a film electrode is formed by the electroplating, the current collector and the active material may firmly and closely contact each other such that, even when fragmentation occurs, detachment of the active material from the current collector may be prevented and the cycle characteristic may be improved. However, if the current collector and the active material become excessively close, the electrode may be affected by a volume change of the active material film due to the intercalation/deintercalation and detaching of Li, such that the expansion of the electrode, generation of creases of the current collector, and/or generation of cracks in the film of the current collector may be remarkably increased. Accordingly, the electric conductivity in the electrode may be lowered. Thus, not only may the cycle characteristic be deteriorated, but cracks may also be generated due to high rigidity of a Sn intermetallic compound.

The multilayer film may include a porous layer and a non-porous layer, which may be alternately formed. In an implementation, the multilayer film may have a structure of, e.g., a first porous layer/a first non-porous layer, a first porous layer/a first non-porous layer/a second porous layer/a second non-porous layer, or a first porous layer/a first non-porous layer/a second porous layer/a second non-porous layer/a third porous layer/a third non-porous layer.

A thickness of the multilayer film may be about 5-15 μm. In order to roll the current collector, a limit of the thickness of the multilayer film may be set during design of a battery. Maintaining the thickness of the overall multilayer film at about 5-15 μm may help ensure that rolling the current collector is possible.

A porosity of the porous layer may be about 40-70%. Maintaining the porosity at about 40% to about 70% may help provide an appropriate space in which the active material may expand with respect to the volume change in terms of the life span characteristic and the initial characteristic. The active material may be broken in a confined container or space. Maintaining the porosity of the porous layer at about 40% or more may help ensure that, even when porous expansion is generated, since an appropriate space to absorb the expansion exists, breakage may be prevented so that the life span characteristic may be guaranteed. Maintaining the porosity of the porous layer at about 70% or less may help ensure that continuity of the layer may be maintained. The pores may provide a smooth path for Li ions during charge/discharge.

The porous layer may have a density of about 4 g/cc or less. Maintaining the density of the porous layer at about 4 g/cc or less may help ensure that drastic characteristic deterioration due to expansion may not occur during the charge/discharge cycle, thereby avoiding generation of cracks and breakage of the active material due to the volume expansion may. In an implementation, the porous layer may have a density of about 1-4 g/cc.

A thickness of the porous layer may be about 1-5 μm. In order to increase the porosity of the porous layer, decrease the density thereof, and simultaneously decrease the size of a particle forming the porous layer, plating may be carried out within a short time. When the plating is carried out such that the thickness of a plating layer can be within the range, a porous layer having the above characteristics may be formed.

The negative electrode may have a structure of a $Cu_4Sn$ current collector layer/a $Cu_6Sn_5$ first porous layer/a Sn first non-porous layer. Considering the thickness and material of each layer, the structure of the negative electrode may be a current collector layer that is an alloy of Sn and Cu (about 2-10 μm)/a porous layer that is an alloy of Sn and Cu (about 2-4 μm)/a non-porous layer of Sn (about 1-4 μm).

Referring to FIG. 1, the negative electrode for a Li ion battery may be formed on the substrate, e.g., stainless steel SUS. The negative electrode of a Li ion battery may include, e.g., a multilayer film in which a non-porous (i.e., high density) Sn based current collector layer plated at a low current density, a porous (i.e., low density) first layer plated at a high current density on the Sn based current collector, a non-porous second layer plated at a low current density, a porous third layer plated at a high current density, and a non-porous fourth layer plated at a low current density are sequentially formed.

Figure 2:
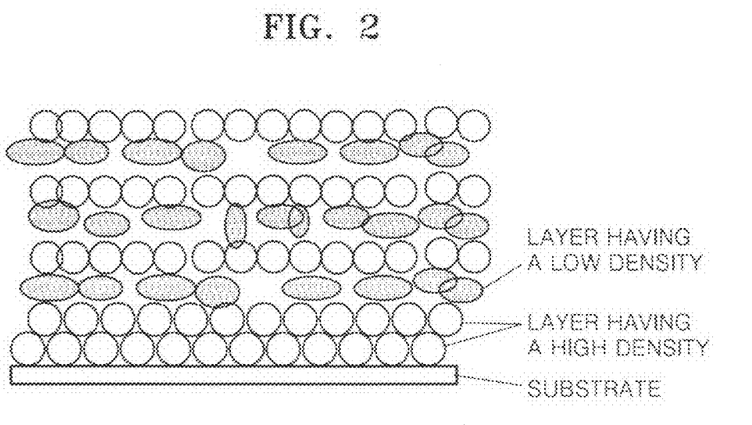
FIG. 2 schematically illustrates a negative electrode for a Li secondary battery including a current collector layer and a 6-layered film according to another embodiment.

FIG. 2 schematically illustrates a negative electrode for a Li secondary battery according to another embodiment. Referring to FIG. 2, the negative electrode for a Li secondary battery may include a multilayer film including a non-porous (i.e., high density) Sn based current collector layer plated at a low current density, a porous (i.e., low density) first layer plated at a high current density on the Sn based current collector layer, a non-porous second layer plated at a low current density, a porous third layer plated at a high current density, a non-porous fourth layer plated at a low current density, a porous fifth layer plated at a high current density, and a non-porous sixth layer plated at a low current density.

Figure 3:
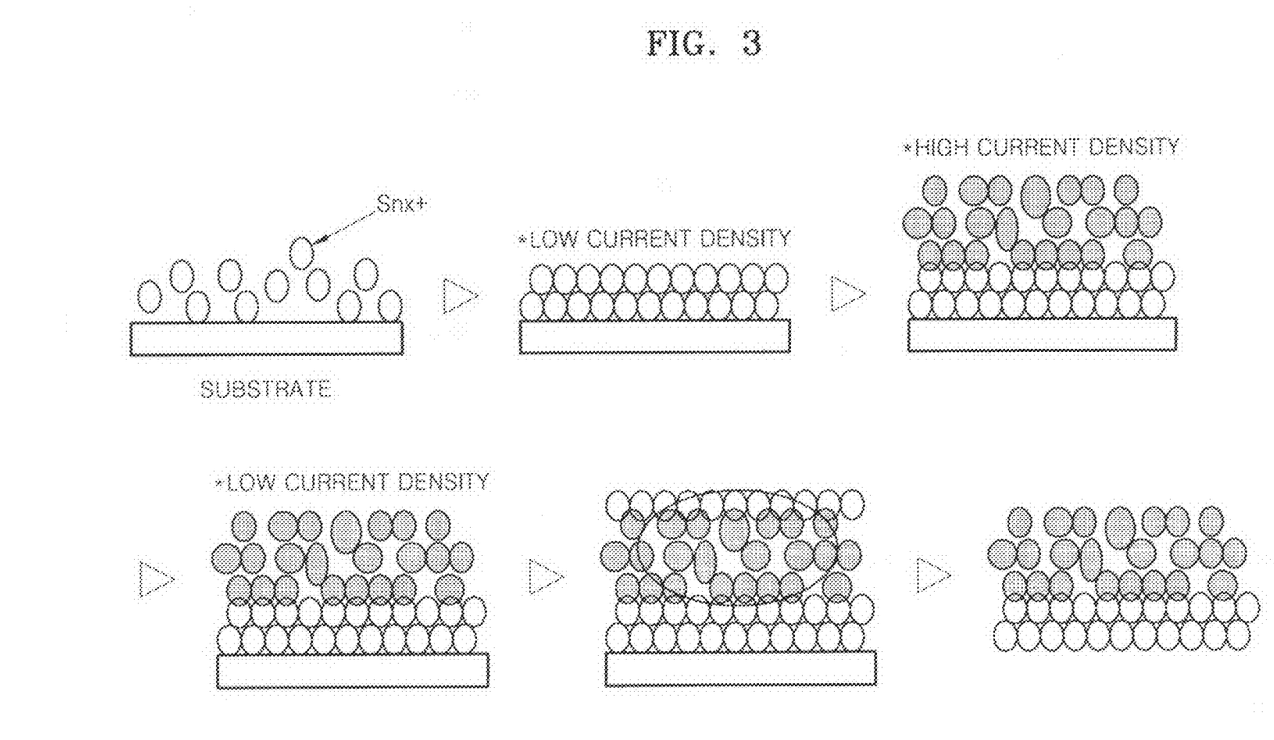
FIG. 3 schematically illustrates stages in a method of manufacturing a negative electrode for a Li secondary battery according to an embodiment.

FIG. 3 schematically illustrates stages in a method of manufacturing a negative electrode for a Li secondary battery according to an embodiment. The manufacturing method may include forming a Sn based current collector layer by plating a plating solution containing Sn on the substrate, forming a porous layer by plating the Sn-containing plating solution on the Sn based current collector layer, forming a non-porous layer by plating the Sn-containing plating solution on the porous layer, and separating the substrate from the Sn based current collector layer.

Referring to FIG. 3, the Sn based current collector layer may be formed by plating the Sn-containing plating solution on the, e.g., stainless steel SUS, substrate at a low current density. Next, the porous first layer may be plated on the Sn based current collector layer at a high current density. Next, the non-porous second layer may be plated at a low current density, thereby forming the multilayer film. Finally, the substrate may be separated from the Sn based current collector layer, thereby obtaining the negative electrode for a Li secondary battery.

The Sn-containing plating solution may include, e.g., Sn or a combination of Sn and at least one of Cu, Ni, Al, Fe, Zn, and Bi. In FIG. 3, "x" denotes the other metal, e.g., Cu, Zn, or Fe, and thus "Snx" denotes, e.g., Sn—Cu, Sn—Zn, or Sn—Fe.

A thickness of the Sn based current collector layer may be about 2-30 μm. Maintaining the thickness of the Sn based current collector layer at about 2 μm or greater may help ensure that sufficient energy density may be secured. Maintaining the thickness of the Sn based current collector layer at about 30 μm or less may help ensure that contraction and expansion is reduced and alloying with other metal may be easy.

A thickness of the porous layer may be about 1-5 μm. When the plating is carried out within a short time such that the thickness of the plated layer is about 1-5 μm, a size of a particle forming the layer may be decreased and density thereof may be decreased, thereby forming a porous layer.

The substrate may be formed of a metal that is not alloyed with Li in the other layers. In an implementation, the substrate may be, e.g., a stainless steel (SUS) substrate, a titanium (Ti) substrate, or an alloy thereof. However, the embodiments are not limited thereto and, e.g., Fe, Cu, Ni, Sn, In, Sb, Zr, Si, or an alloy thereof may be used under the condition of not having a current collector characteristic. A thickness of the substrate may be, e.g., about 5-30 μm.

When a film is formed by plating a Sn alloy on the substrate by electroplating, sizes of Sn particles may be different from one another so that a layered structure with a specific porosity may be provided. For example, by decreasing sizes of particles of the first layer and increasing sizes of particles of the second layer in the multilayer film, particle layers of different sizes may be provided.

Also, the porosity of an interior of each layer may be adjusted. Accordingly, pores may increase a specific surface area so that expansion during charge/discharge may be compensated for.

The above structure may be obtained by fragmenting sizes of particles formed on the substrate by changing, e.g., the Sn concentration, temperature, or current density, during the plating process to change the formation speed of the Sn particles. In particular, forming a layer at a higher current density may result in formation of a layer having a higher porosity and lower density. Further, forming a layer at a lower current density may result in formation of a layer having a lower porosity and higher density.

The plating may be electroplating of an alloy of Sn and at least one of Cu, Bi, Fe, and Ni. The layered structure having different particle sizes may be provided by changing, e.g., the temperature of a plating solution, plating time, or current during the formation of the plated layer.

The plating solution may be a sulfur tin plating solution in which $SnSO_4$ is dissolved, e.g., sulfate bath, and sulfur, gelatine beta-naphthol formalin, or cresolsulfon acid may be added. For smooth plating, other additives may be used. A plating solution in which $Sn(BF_4)_2$ or $Na_2SnO_3.3H_2O$ may be used.

When $CuSO_4.5H_2O$ is used in $SnSO_4$, SnCu alloyed plating is possible. Also, alloy plating is possible by using nitrate or sulfate of Ni, Fe, Bi, or In in the Sn-containing plating solution. The above plating solution may be common and may have a characteristic that varies according to the addition of an additive and a dispersing agent.

The plating solution may be used through dry bath and agitation. The temperature of the plating solution may be about 30-60° C. The temperature range of the plating solution is used in general plating technology.

An agitation solution may be injected through a pump. A time for forming a plated film may be adjusted according to a strength of injection. A strong agitation may allow application of a high current and reduce plating time.

The plating time may be adjustable according to a desired thickness of a layer. The plating time may be less than about 10 minutes. The current density may be about 0.5-40 mA/dm$^2$, and may be about 15-30 mA/dm$^2$ for coarse particle formation.

The above conditions may vary according to a state of a plating solution so that the state of a layer may be adjusted according to the plating time, the current density, the temperature, and the amount of agitation.

After the plating layer is formed, a Sn intermetallic compound may be obtained by diffusion and thermal expansion so that the diffusion layer may be completed as an active material. The intermetallic compound may have a layered structure having different particle sizes. The intermetallic compound may be generated by performing heat treatment in a non-oxidizing atmosphere after plating.

The porous layer having a fine pore of the multilayer film may reduce the volume change during charging/discharging. Also, in the layered structure, the Sn based current collector layer first coated on the top end of the metal substrate, e.g., the stainless (SUS) substrate, may be formed of particles smaller than the structure of the first layer so that closeness to the metal substrate may be increased by the heat diffusion process. Thus, the separation between the substrate and the active material due to the expansion may be prevented.

The structure of the negative electrode formed in the above plating process may be, e.g., a Sn based current collector layer/a first porous layer/a first non-porous layer, a Sn based current collector layer/a first porous layer/a first non-porous layer/a second porous layer/a second non-porous layer, or a Sn based current collector layer/a first porous layer/a first non-porous layer/a second porous layer/a second non-porous layer/a third porous layer/a third non-porous layer.

The structure of the negative electrode may be a Sn based current collector layer/a Sn and Cu alloy porous layer/a Sn and Cu alloy non-porous layer, for example, a $Cu_4Sn$ current collector layer/a $Cu_6Sn_5$ first porous layer/a Sn first non-porous layer.

A Li secondary battery employing the negative electrode for a Li secondary battery according to another embodiment may be manufactured as follows. First, a positive electrode active material composite may be prepared by mixing a positive electrode active material, a conductive agent, a binding agent, and a solvent. A positive electrode plate may be prepared by directly coating and drying the positive electrode active material composite on an aluminum current collector. Alternatively, the positive electrode active material composite may be cast on a separate support. Then, a film may be separated from the support and laminated on the aluminum current collector to manufacture the positive electrode plate.

A Li metal oxide may be used as the positive electrode active material and any material that is used in the field to which the embodiments pertains may be used without limit. For example, $LiCoO_2$, $LiMn_xO_{2x}$, $LiNi_{x-1}Mn_xO_{2x}$ (x=1, 2), or $LiNi_{1-x-y}Co_xMn_yO_2$ (0≤x≤0.5, 0≤y≤0.5) may be used.

Carbon black may be used as the conductive agent. Vinylidene fluoride/hexa fluoro propylene copolymer, polyvinylidene fluoride, polyacrylonitrile, polymethyl methacrylate, polytetrafluoroethylene, and a combination thereof, or styrene-butadiene rubber based polymer may be used as the binding agent. N-methylpyrrolidone, acetone, or water may be used as the solvent. Relative contents of the positive electrode active material, the conductive agent, the binding agent, and the solvent may be of a level that is typically used in the Li battery.

As described above, the negative electrode plate in which a multilayer film is formed on the current collector layer may be obtained. Any suitable material that may be used in a Li battery may be used as the separator. In particular, a material having a low resistance to the ion movement of electrolyte and a superior electrolyte solution moisturizing ability may be used. The separator may include, e.g., glass fiber, polyester, Teflon, polyethylene, polypropylene, polytetrafluoroethylene (PTFE), and/or a combination thereof. In an implementation, the separator may be in form of nonwoven fabric or woven fabric. In detail, a separator capable of being wound and formed of a material, e.g., polyethylene or polypropylene, may be used for a Li-ion battery. A separator exhibiting a superior organic electrolyte solution dipping ability may be used for a Li-ion polymer battery. The separator may be manufactured by the following method.

A separator composite may be prepared by mixing polymer resin, a filler, and a solvent. The separator composite may be directly coated on an upper portion of an electrode and then dried so that a separator film may be formed. Alternatively, after the separator composite is cast on a support and then dried, the separator film may be separated from the support and laminated on the upper portion of an electrode.

The polymer resin is not particularly limited and any suitable material used for the binding agent of an electrode plate may be used. For example, vinylidene fluoride/hexafluoro propylene copolymer, polyvinylidene fluoride, polyacrylonitrile, polymethyl methacrylate, and a combination thereof may be used as the polymer resin. In particular, the vinylidene fluoride/hexafluoro propylene copolymer in which the content of hexafluoro propylene is about 8-25 parts by weight may be used.

A battery structure may be formed by arranging the separator between the positive electrode plate and the negative electrode plate. The battery structure may be wound or folded to be inserted in a cylindrical or rectangular battery case. An organic electrolyte solution may be injected in the battery case to complete a Li-ion battery. Alternatively, the battery structure may be deposited in a bi-cell structure, dipped into the organic electrolyte solution, and sealed in a pouch, thereby completing a Li-ion polymer battery.

The organic electrolyte solution may include Li salt and a mixed organic solvent formed of high dielectric solvent and a low boiling point solvent, and may further include a variety of additives, e.g., overcharge prevention agent, as necessary. The high dielectric solvent used for the organic electrolyte solution is not particularly limited in its material. For example, a cyclic carbonate such as ethylene carbonate, propylene carbonate, butylene carbonate, or γ-butyrolactone may be used as the high dielectric solvent.

Also, any suitable material may be used as the low boiling point solvent. For example, a chain carbonate such as dimethyl carbonate, ethyl methyl carbonate, diethyl carbonate, or dipropyl carbonate, dimethoxyethane, diethoxyethane, or fatty acid ester derivates may be used as the low boiling point solvent.

At least one hydrogen atom in the high dielectric solvent and the low boiling point solvent may be replaced by a halogen atom, e.g., by fluorine. A mixing ratio between the high dielectric solvent and the low boiling point solvent may be about 1:1 to 1:9 by volume. Maintaining the mixing ratio at about 1:1 to 1:9 by volume may help ensure that discharge capacity and charge/discharge life span are not deteriorated.

Also, any suitable material used for a Li battery may be used for the Li salt in the organic electrolyte solution. For example, the Li salt may include $LiClO_4$, $LiCF_3SO_2$, $LiPF_6$, $LiN(CF_3SO_2)_2$, $LiBF_4$, $LiC(CF_3SO_2)_3$, and/or $LiN(C_2F_5SO_2)_2$.

A concentration of the Li salt in the organic electrolyte solution may be about 0.5-2 M. Maintaining the concentration of the Li salt at about 0.5 M or greater may help ensure that conductivity of the electrolyte solution does not decrease, thereby ensuring satisfactory performance of the electrolyte solution. Maintaining the concentration of the Li salt at about 2.0 M or less may help ensure that a viscosity of the electrolyte solution does not increase, thereby ensuring satisfactory mobility of the Li ions.

The embodiments will be described in detail through the following examples and comparative examples. However, the examples are merely for explanation and are not limiting.

Example 1

1) Forming a Current Collector Layer

About 1 L of plating solution was formed by adding water to about 150 g of tin sulfate, about 20 g of copper sulfate, and about 200 g of sulfuric acid. The plating solution was plated on a stainless steel SUS substrate having a thickness of about 15 μm at a temperature of about 40° C. and a current density of about 5 mA/dm$^2$ for about 120 seconds, thereby forming a high density film (layer). The density of the layer was about 6.99 g/cc, which was calculated by measuring the thickness of the plating layer, the weight of plating, and the area of plating. The density value of a plating sample was calculated by plating weight/(thickness of plating layer×area of sample).

The weight of plating was about 0.00035 g. The thickness of the plating layer was about 5 μm. The area of the sample was about 1 cm$^2$.

The porosity of the layer was about 0.4%, which was calculated by a weight measurement method using a porosity measurement apparatus. The thickness of the layer was measured by a micro meter method and the result of measurement was about 4 μm.

2) Forming a First Layer

A layer having a thickness of about 1.5 μm was formed on the current collector layer by plating the same plating solution described above at a temperature of about 40° C. and a current density of about 20 mA/dm$^2$ for about 5 seconds. The density of the first layer was about 3 g/cc. The porosity of the first layer was measured in the same method as described above and the result of measurement was about 63%.

3) Forming a Second Layer

A second layer as formed on the first layer in the same method as that used for forming the current collector. The thickness, density, and porosity of the second layer were about 3 μm, about 6 g/cc, and about 6%, respectively.

4) Separating the SUS Substrate

The SUS substrate was separated from the Sn based current collector layer. Thus, a negative electrode for a Li secondary battery having a structure of a $Cu_4Sn$ current collector layer/a $Cu_6Sn_5$ first porous layer/a Sn first non-porous layer was obtained.

Example 2

A third layer was formed on a multilayer film prepared according to Example 1 by using the same method used for forming the first layer in Example 1. Thus, a negative electrode for a Li secondary battery having a structure of a $Cu_4Sn$ current collector layer/a $Cu_6Sn_5$ first porous layer/a Sn first non-porous layer/a second porous layer/a second non-porous layer was obtained. The thickness, density, and porosity of the second layer were about 3 μm, about 3 g/cc, and about 60%, respectively.

Comparative Example 1

A Cu foil as used as the current collector. The same plating solution as that used in Example 1 was used as the plating solution. A Sn additive (Hojinsa HT-31) was added to the plating solution at a rate of about 50 ml per about 1 liter. A high density film (layer) having a thickness of about 10 μm was formed on a Cu substrate at a temperature of about 40° C. and a current density of about 3 mA/dm$^2$ by using the above plating solution, thereby forming a negative electrode for a Li secondary battery.

Comparative Example 2

A Cu foil was used as the current collector. The same plating solution as that used in Example 1 was used as the plating solution. A high density film (a first layer) was formed by plating the plating solution on a Cu substrate to a thickness of about 15 μm and at a temperature of about 40° C. and a current density of about 5 mA/dm$^2$. The density and porosity of the layer were about 6.99 g/cc and about 0.4%, respectively.

A layer (a second layer) was formed by plating the same plating solution on the first layer to a thickness of about 1.5 μm and at a temperature of about 40° C. and a current density of about 20 mA/dm$^2$ for about 5 seconds. The density and porosity of the layer were about 3 g/cc and about 63%, respectively.

A third layer was formed on the second layer in the same method as that used for forming the first layer. The thickness, density, and porosity of the third layer were about 3 μm, about 6 g/cc, and about 6%, respectively. As a result, a negative electrode for a Li secondary battery having a structure of a Cu substrate/a non-porous layer (a first layer)/a porous layer (a second layer)/a non-porous layer (a third layer) was completed.

Experiment Example

Cycle Characteristic Test

A 2016-form coin cell was manufacturing by using the electrode obtained from the Examples 1 and 2 and the Comparative Examples 1 and 2 as a negative electrode and Li metal as a positive electrode. The capacity was measured by charging constant current (CC)/constant voltage (CV), that is, about 0.01 C/0.01 V cut-off and discharging about 1.5 V cut-off at a CC of about 0.1 C, at a charge/discharge speed of about 0.1 C.

A 1.3 M LiPF$_6$ electrolyte solution was created in a mixed solvent of ethylene carbonate (EC), diethylene carbonate (DEC), and fluoroethylene carbonate having a volume ratio of about 2/6/2. CC charge was performed to the Li electrode at a current of about 100 mA per about 1 g of active material until the voltage reached about 0.001 V. While maintaining the voltage of 0.001 V, the CV charge was performed until the current decreased to about 10 mA per about 1 g of active material. A cell completely charged had a pause period of about 10 minutes. Then, the CC discharge was performed at a current of about 100 mA per about 1 g of active material until the voltage reached about 1.5 V. Results are shown in Table 1.

TABLE 1

|  | Initial Discharge Capacity (mAh/g) | After 14 Times of Cycles (mA/g) | Capacity Maintenance Rate (%) |
|---|---|---|---|
| Example 1 | 588 | 360 | 61 |
| Example 2 | 492 | 355 | 72 |
| Comparative Example 1 | 656 | 176 | 26 |
| Comparative Example 2 | 568 | 164 | 28 |

According to Table 1, it may be seen that the capacity maintenance rate was improved in the Examples 1 and 2 compared to the Comparative Examples 1 and 2.

Figure 4:
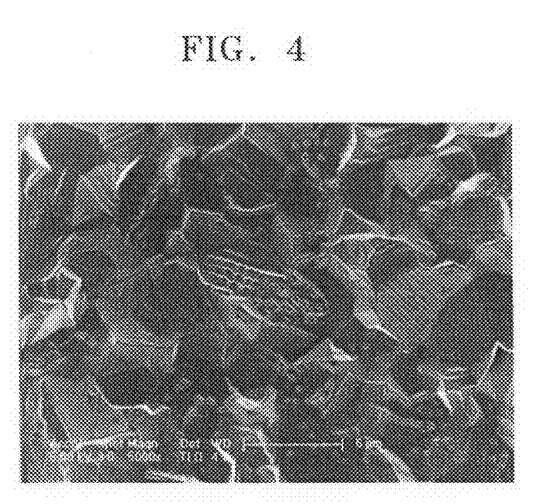
FIG. 4 illustrates a SEM image of a surface of a porous layer of a multilayer according to an embodiment.

FIG. 4 illustrates a SEM image of a surface of a porous layer of a multilayer film according to an embodiment (magnified by 5000 times). Referring to FIG. 4, tiny particles may not be formed densely, but rather sparsely and porously. Thus, by decreasing the size and density of particles in the layer, the number of particles formed on the surface may be reduced as a whole.

Figure 5:
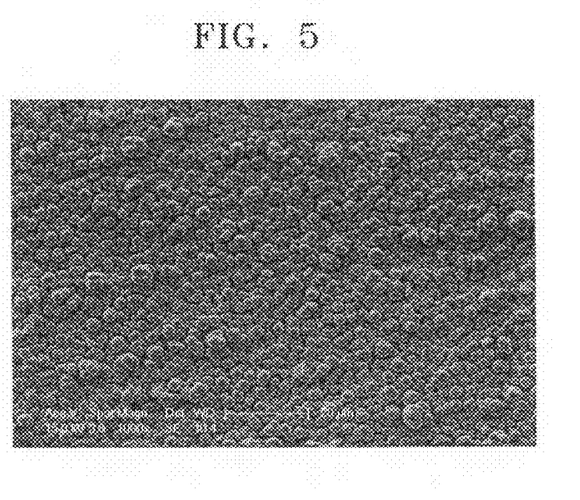
FIG. 5 illustrates a SEM image of a surface of a non-porous layer of a multilayer according to an embodiment.

FIG. 5 illustrates a SEM image of a surface of a non-porous layer of a multilayer film according to an embodiment (magnified by 5000 times). Referring to FIGS. 4 and 5, it may be seen that the size of a particle in the porous layer is relatively small and porosity between particles is relatively large.

Figure 6:
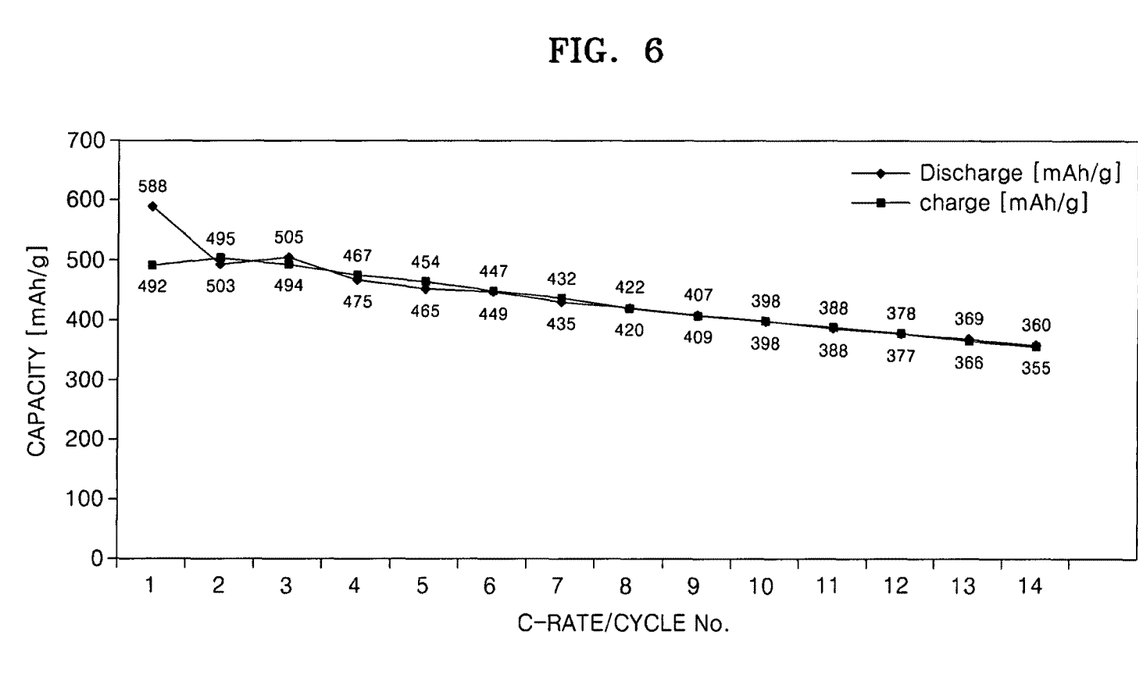
FIGS. 6 and 7 illustrate graphs showing the result of measurement of a cycle characteristic of a Li secondary battery of Example 1.
Figure 7:
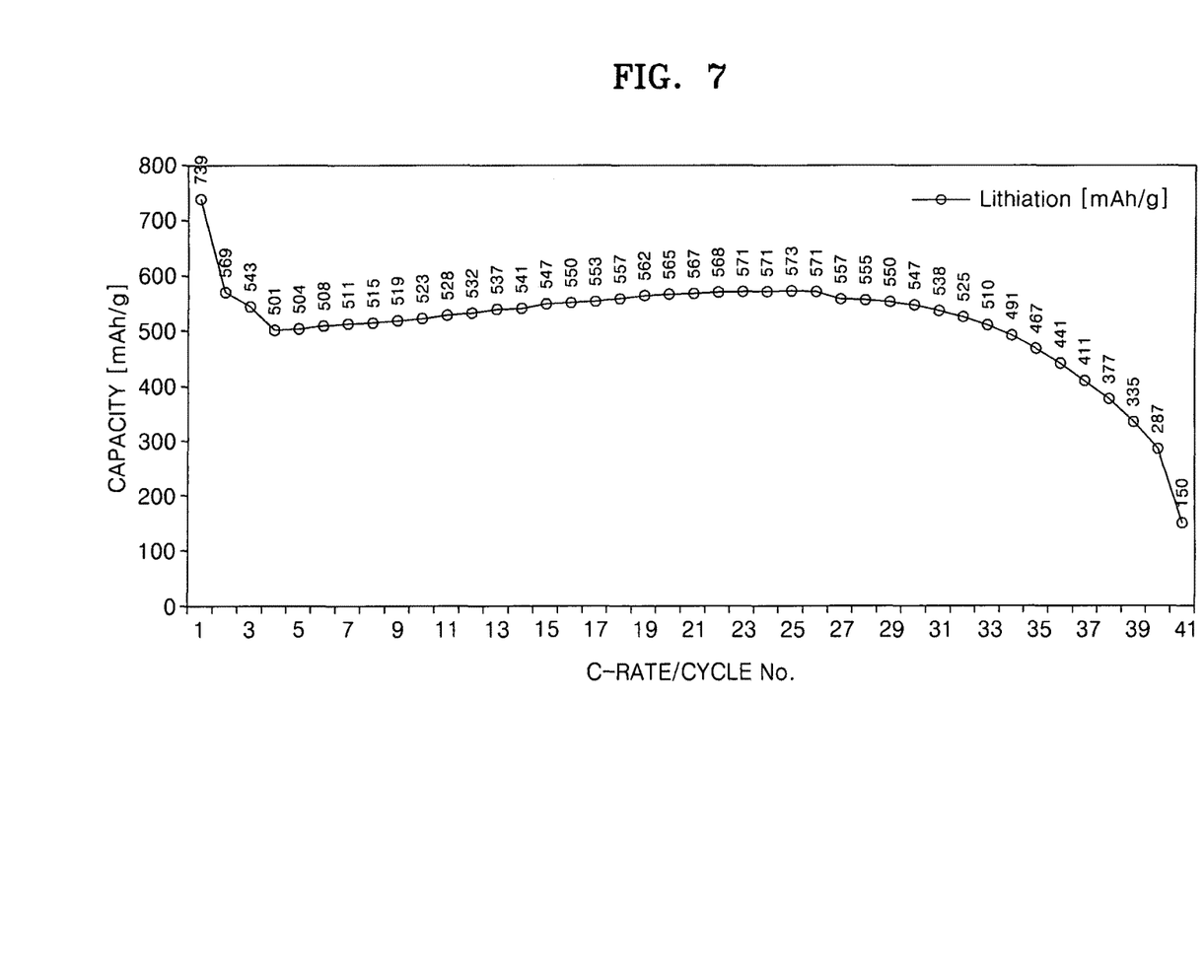
Figure 8:
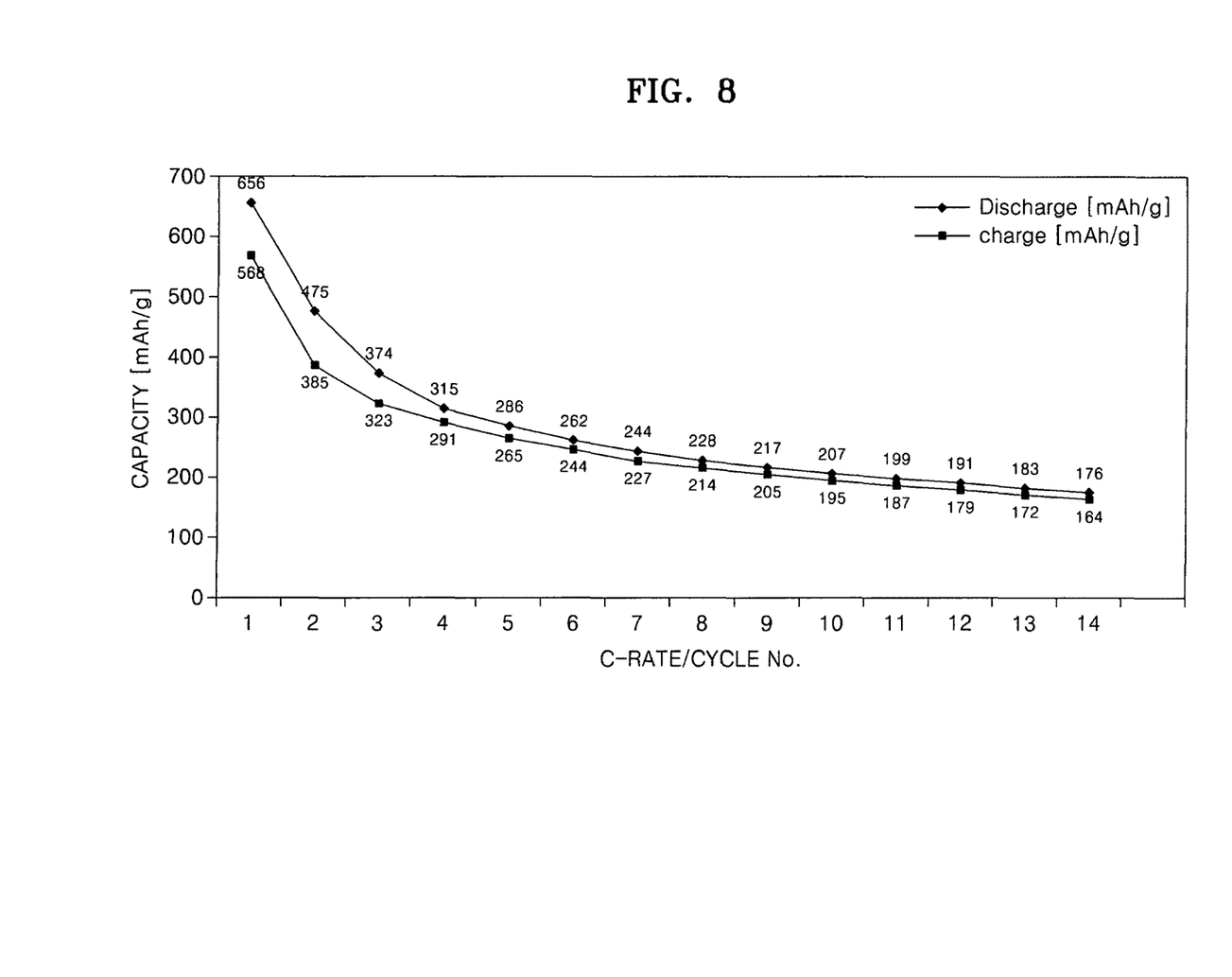
FIGS. 8 and 9 illustrate graphs showing the result of measurement of a cycle characteristic of a Li secondary battery of Comparative Example 1.
Figure 9:
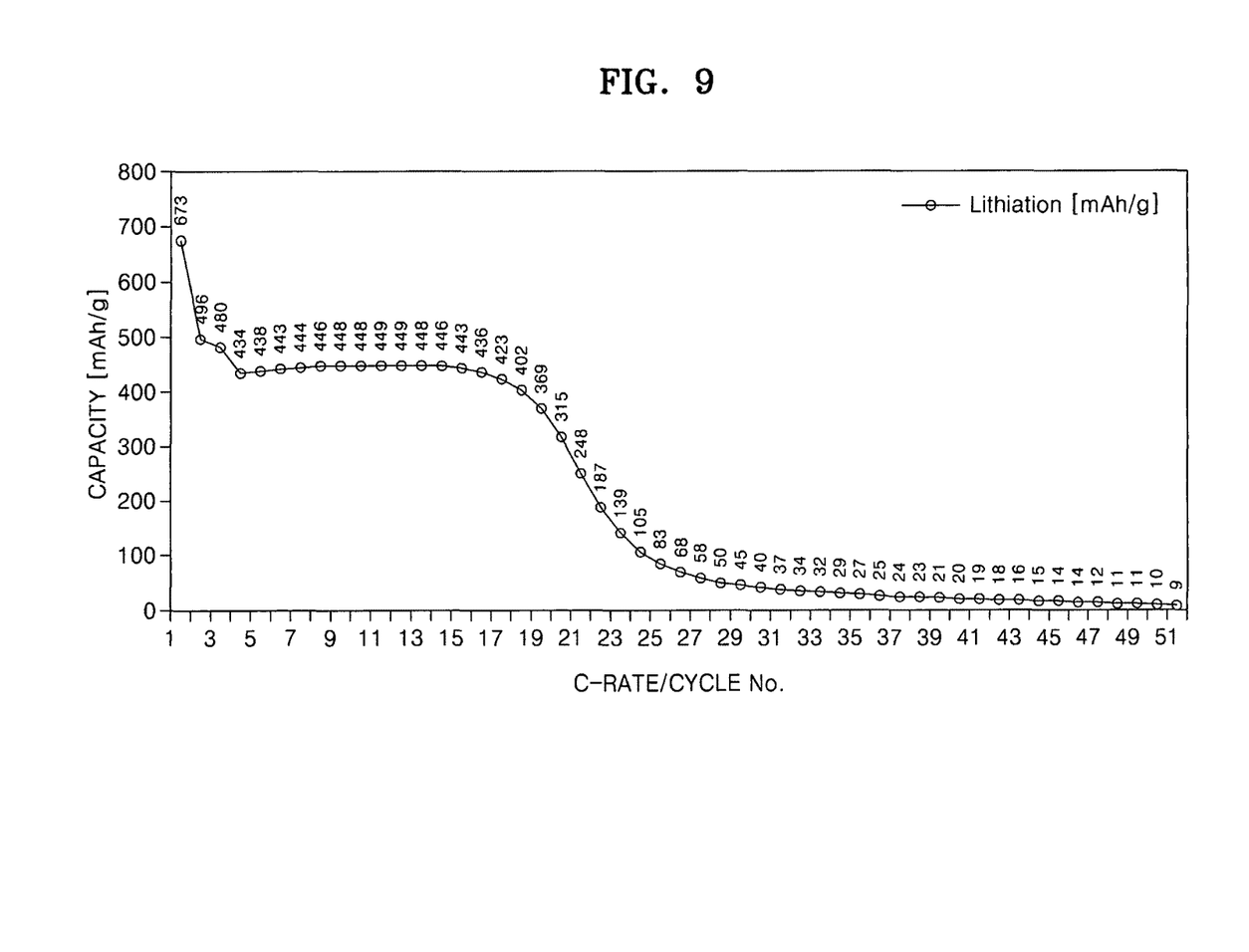

FIGS. 6 and 7 illustrate graphs showing results of measurements of a cycle characteristic of the Li secondary battery according to Example 1. FIGS. 8 and 9 illustrate graphs showing results of measurements of a cycle characteristic of the Li secondary battery according to Comparative Example 2.

Referring to FIGS. 6-9, it may be seen that the cycle characteristic of Example 1 was superior to that of Comparative Example 2. According to FIGS. 8 and 9, the life span of a battery was deteriorated according to the volume expansion due to the omission of the plating layer.

As described above, the Li secondary battery having a negative electrode according to the one or more of the above embodiments may have an improved cycle characteristic, which may not be deteriorated due to charge/discharge. Also, since the Li secondary battery having a negative electrode according to the one or more of the above embodiments may not include a metal substrate, the electrode may have superior flexibility and variability and may be used for a thin film electrode.

Other than the substrate, however, the negative electrode of an embodiment may use a metal or alloy instead of carbon based material, or an oxide, emulsion, or a nitride thereof. In particular, the negative electrode of an embodiment main entail use of a metal material having as large a discharge capacity as that of the negative active material.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A negative electrode for a lithium (Li) secondary battery, the negative electrode comprising:
   a tin (Sn) based current collector layer; and
   a multilayer film on the Sn based current collector, the multilayer film having two or more layers,
   wherein the multilayer film includes a porous layer directly on the Sn based current collector layer.

2. The negative electrode for a lithium (Li) secondary battery as claimed in claim 1, wherein the Sn based current collector layer includes Sn or a combination of Sn and at least one of copper (Cu), nickel (Ni), aluminum (Al), iron (Fe), zinc (Zn), and bismuth (Bi).

3. The negative electrode for a lithium (Li) secondary battery as claimed in claim 1, wherein the Sn in the Sn based current collector layer is included in an amount of about 40-90 wt % based on a total weight of the current collector layer.

4. The negative electrode for a lithium (Li) secondary battery as claimed in claim 1, wherein each layer of the multilayer film independently includes Sn or a combination of Sn and at least one of copper (Cu), nickel (Ni), aluminum (Al), iron (Fe), zinc (Zn), and bismuth (Bi).

5. The negative electrode for a lithium (Li) secondary battery as claimed in claim 1, wherein a porous layer and a non-porous layer are alternately disposed in the multilayer film.

6. The negative electrode for a lithium (Li) secondary battery as claimed in claim 1, wherein the multilayer film has a structure of:

a first porous layer/a first non-porous layer, a first porous layer/a first non-porous layer/a second porous layer/a second non-porous layer, or a first porous layer/a first non-porous layer/a second porous layer/a second non-porous layer/a third porous layer/a third non-porous layer.

7. The negative electrode for a lithium (Li) secondary battery as claimed in claim 1, wherein the porous layer has a porosity of about 40-70%.

8. The negative electrode for a lithium (Li) secondary battery as claimed in claim 1, wherein the porous layer has a density of about 4 g/cc or less.

9. The negative electrode for a lithium (Li) secondary battery as claimed in claim 1, wherein the porous layer has a thickness of about 1-5 μm.

10. The negative electrode for a lithium (Li) secondary battery as claimed in claim 1, wherein the negative electrode has a structure of a $Cu_4Sn$ current collector layer/a $Cu_6Sn_5$ first porous layer/a Sn first non-porous layer.

11. A lithium (Li) secondary battery including the negative electrode for a lithium (Li) secondary battery as claimed in claim 1.

12. A negative electrode for a lithium (Li) secondary battery, the negative electrode comprising:

a tin (Sn) based current collector layer; and a multilayer film on the Sn based current collector, the multilayer film having two or more layers, wherein:

the multilayer film includes at least one porous layer, and the negative electrode has a structure of a $Cu_4Sn$ current collector layer/a $Cu_6Sn_5$ first porous layer/a Sn first non-porous layer.

* * * * *